United States Patent [19]
Fujita

[11] Patent Number: 5,870,209
[45] Date of Patent: Feb. 9, 1999

[54] INFORMATION PROCESSING APPARATUS

[75] Inventor: Tadanobu Fujita, Kawasaki, Japan

[73] Assignee: Canon Kabushiki Kaisha, Tokyo, Japan

[21] Appl. No.: 964,238

[22] Filed: Nov. 4, 1997

Related U.S. Application Data

[63] Continuation of Ser. No. 404,273, Mar. 14, 1995, abandoned.

[30] Foreign Application Priority Data

Mar. 16, 1994 [JP] Japan ..................................... 6-071612

[51] Int. Cl.⁶ ...................................................... H04N 1/32
[52] U.S. Cl. ............................................ 358/468; 358/400
[58] Field of Search ...................... 358/404, 406, 358/434, 435, 436, 437, 438, 439, 442, 468, 400, 443, 460; 379/100.02, 100.04, 100.05, 100.06; 455/343

[56] References Cited

U.S. PATENT DOCUMENTS 5,282,054   1/1994   Oana et al. .............................. 358/406

*Primary Examiner*—David K. Moore
*Assistant Examiner*—Jerome Grant II
*Attorney, Agent, or Firm*—Fitzpatrick Cella Harper & Scinto

[57] ABSTRACT

It is an object to provide an information processing apparatus capable of attaining proper energy savings in accordance with a facsimile transmission/reception operation and capable of being driven with a battery. To perform facsimile transmission/reception in a system suspend state, information representing that a system has been resumed for FAX transmission/reception is used to turn off the power supply of a device unnecessary for this operation. At the end of this operation, a suspend state is restored.

42 Claims, 4 Drawing Sheets

INFORMATION PROCESSING APPARATUS

This is a continuation of application Ser. No. 08/404,273 filed Mar. 14, 1995 now abandoned.

BACKGROUND OF THE INVENTION

1. Field of the Invention

The present invention relates to an information processing apparatus having a facsimile communication function (FAX modem IC card unit) and an energy saving function (suspend-state mode) and capable of being driven with a battery.

2. Related Background Art

A conventional notebook personal computer capable of being driven with a battery and having a facsimile communication function (FAX modem IC card unit) and an energy saving function (suspend-state mode) is available.

When the system of this personal computer set in a suspend state is to perform facsimile reception in automatic call reception, the personal computer detects a ring signal from a communication line and is resumed. The personal computer then disables the energy saving function and powers on the entire system, thereby performing a receiving operation.

When the system of this personal computer is to transmit facsimile transmission image data at a designated time, the system detects an RTC (Real Time Clock) interrupt in its suspend state and is resumed. The personal computer then disables the energy saving function of the system and powers on the entire system, thereby performing a transmitting operation.

In the prior art described above, however, since the system is resumed to shift the operation from the suspend state to facsimile transmission/reception, and the entire system is powered on to perform the transmitting/receiving operation, the power supply of a device (e.g., a display) unnecessary for transmission/reception is also turned on and operated. The energy saving function is wasteful.

After automatic reception/transmission, the system does not resume operation of the energy saving mode, that is, does not shift to the suspend-state mode, until no operator input has been detected continuously for a predetermined period of time, even though the system has detected that the system is in a state in which the operator is not using the personal computer. Accordingly, even though nobody is using the personal computer, the entire system is powered on for a predetermined period of time thus wasting power.

SUMMARY OF THE INVENTION

It is an object of the present invention to improve an information processing apparatus.

It is another object of the present invention to improve an information processing apparatus having a facsimile communication function.

It is still another object of the present invention to improve an information processing apparatus having an energy saving mode.

It is still another object of the present invention to provide a battery-driven information processing apparatus capable of achieving proper energy savings in facsimile transmission/reception.

DETAILED DESCRIPTION OF THE PREFERRED EMBODIMENTS

Figure 1:
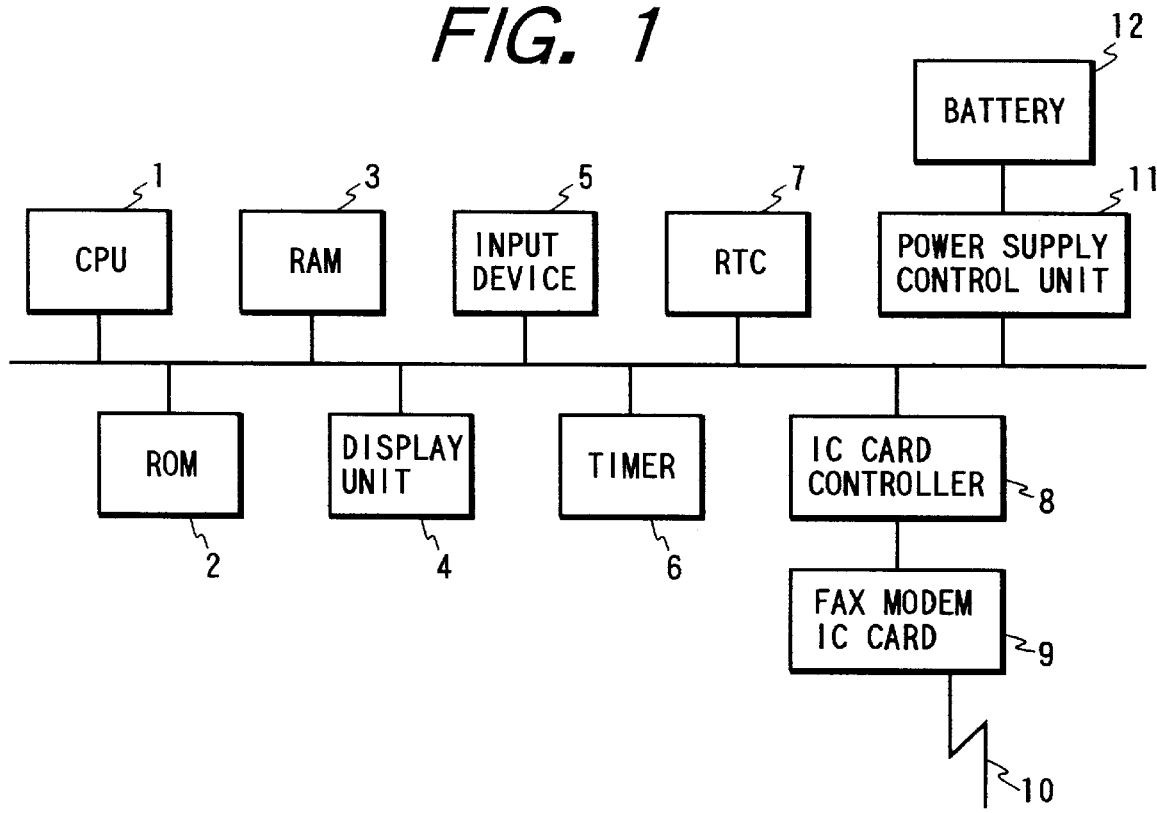
FIG. 1 is a block diagram showing the first embodiment of the present invention.

FIG. 1 is a block diagram showing the first embodiment of the present invention.

A CPU 1 serves as a processor for controlling the overall system. A ROM 2 mainly stores a system program, a service routine such as operations for a variety of hardware, and the suspend-process and the resume-process routines.

A RAM 3 stores application programs and data. A display unit 4 serves as a display section, e.g., an LCD display and displays a program execution state or the like. An input device 5 serves as an input section, e.g., a keyboard and inputs data and process commands. A timer 6 periodically generates an interrupt to the CPU 1.

An RTC (Real Time Clock) 7 has a function of counting time and a function of generating an interrupt (and a resume-request) when the current time reaches a preset time.

An IC card controller 8 serves as an IC card control section for requesting a resume-process upon detection of a ring signal from a public telephone line 10. A facsimile (FAX) modem IC card 9 is an IC card having a facsimile transmission/reception function and a modem function. A power supply control unit 11 checks the remaining capacity of a battery 12 and performs charge control.

Figure 2:
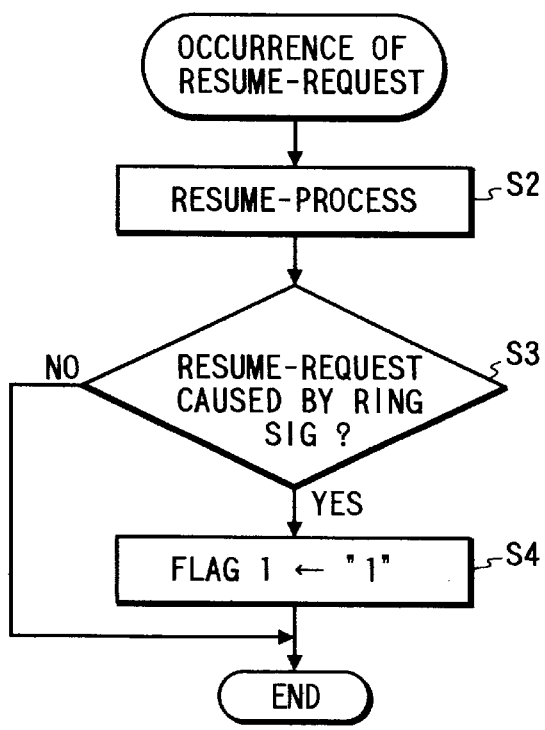
FIG. 2 is a flow chart showing a resume-process of the first embodiment.

FIG. 2 is a flow chart showing the resume-process stored in the ROM 2 for the CPU 1.

This flow chart shows a process to be performed when a resume-request (ring signal) occurs when the system is in the suspend state (energy saving mode).

When a resume-request occurs, the resume-process of step 2 shifts the system from the suspend state or energy saving mode, in which the operation of the CPU is stopped and only refreshing of the RAM 3 is being performed, to the normal operation mode in which the CPU 1 is operative.

CPU 1 determines in step S3 whether a ring signal caused this resume-request. If YES in step S3, the flow advances to step S4; otherwise, this process ends because the process is not a reception process of this embodiment.

In step S4, "1" representing that the system is resumed by the ring signal is stored in the RAM 3 as flag 1 (flag 1="1"), and this process ends.

Figure 3:
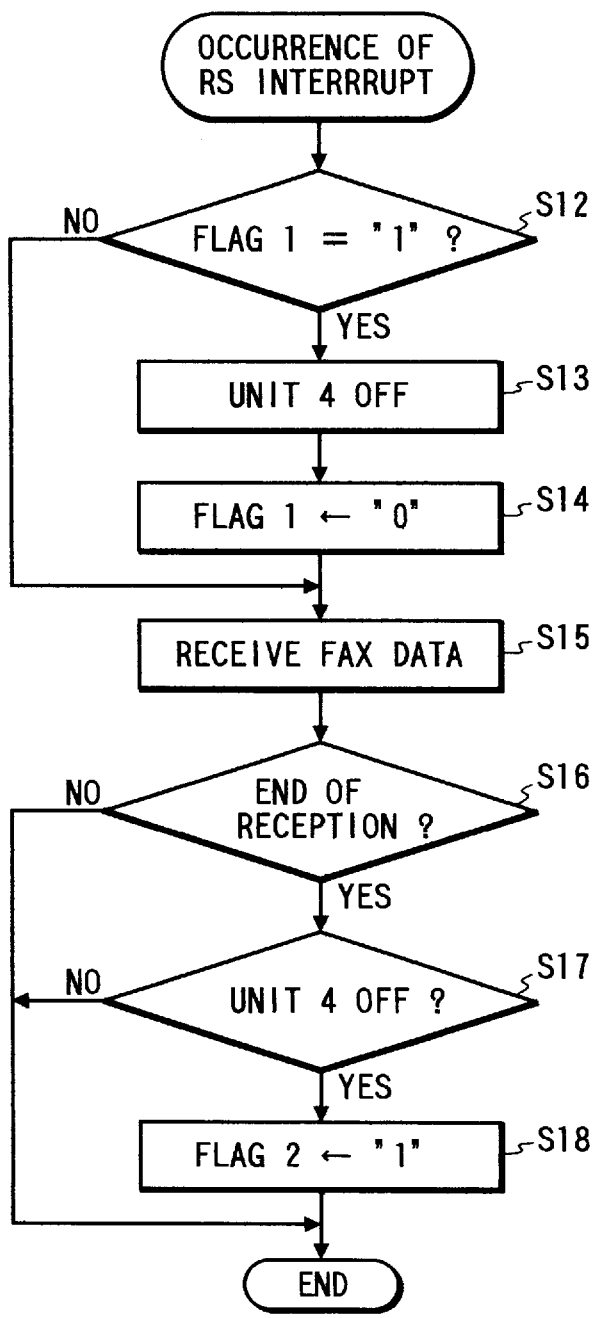
FIG. 3 is a flow chart showing a reception operation of the first embodiment.

FIG. 3 is a flow chart showing a reception operation of the CPU 1 in accordance with a facsimile program.

This flow chart shows the reception operation upon occurrence of an RS interrupt every time 1-byte facsimile data is sent.

When an RS interrupt occurs, in step S12, flag 1 is read out from the RAM 3 and the CPU 1 determines whether the resume-process was started by the ring signal. If so (flag 1="1"), the flow advances to step S13; otherwise (flag 1="0"), the flow advances to step S15.

In step S13, the power supply of a device (display unit 4) which is not associated with the reception operation is kept off. In step S14, flag 1 is cleared (flag 1="0"), and then the flow advances to step S15.

In step S15, 1-byte data is received as facsimile data.

The CPU 1 determines in step S16 whether data reception has ended. If NO in step S16, this interrupt process ends, and the CPU 1 waits for the next interrupt process.

However, if YES in step S16, the flow advances to step S17 to determine whether the power supply of the device (display unit 4) which is not associated with the reception is turned off. If NO in step S17, the interrupt process ends to terminate the reception operation.

However, if YES in step S17, the flow advances to step S18 to set flag 2 representing a suspend-request to "1" (flag 2="1") so as to set the system in the suspend state. This flag is stored in the RAM 3, and the interrupt process ends, thereby terminating the reception operation.

Figure 4:
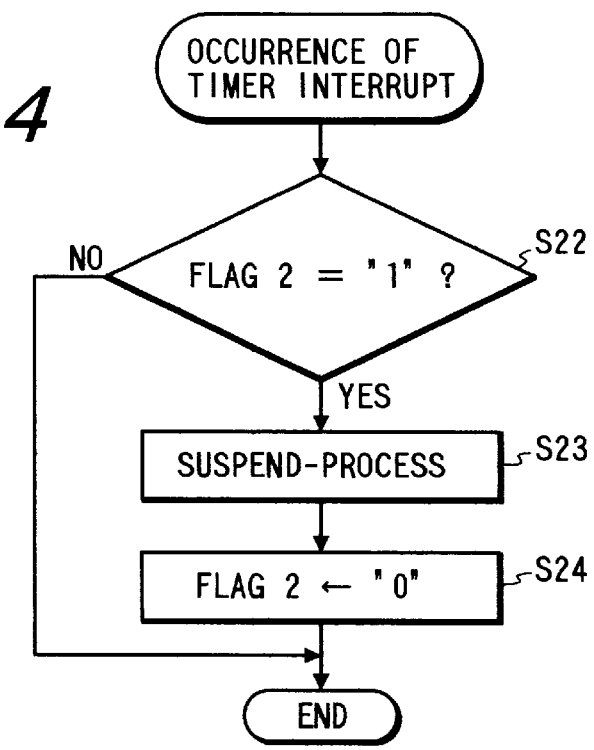
FIG. 4 is a flow chart showing a suspend-process of the first embodiment.

FIG. 4 is a flow chart showing a suspend-process of the ROM 2.

This flow chart shows an operation for performing a suspend-process upon occurrence of a timer interrupt.

Upon occurrence of a timer interrupt, flag 2 is read out from the RAM 3 to determine in step S22 whether a suspend-request has occurred. If NO (flag 2 ="0") in step S22, the process ends. However, if YES (flag 2="1") in step S22, the flow advances to step S23 to set the system in the suspend state. In step S24, flag 2 is cleared (flag 2="0"), and this process ends.

In this manner, when the system is resumed to perform facsimile reception upon detection of a ring signal in the system suspend state, information representing that the system has been resumed in accordance with the ring signal is stored. Using this information, the power supply of a device unnecessary for reception is kept off, and a reception operation is performed. At the end of reception, the system is immediately set in the suspend mode.

The second embodiment of the present invention will be described below. The arrangement of the second embodiment is the same as that of the first embodiment in FIG. 1.

In the second embodiment, an RTC interrupt is used to cause a facsimile program to perform transmission at a designated time under the control of a CPU 1. This RTC interrupt serves as a resume-request. The CPU 1 causes the RTC to designate a transmission start time and waits for transmission in accordance with the facsimile transmission program. When the current time reaches the designated time, an RTC interrupt occurs to start transmission at the designated time.

Figure 5:
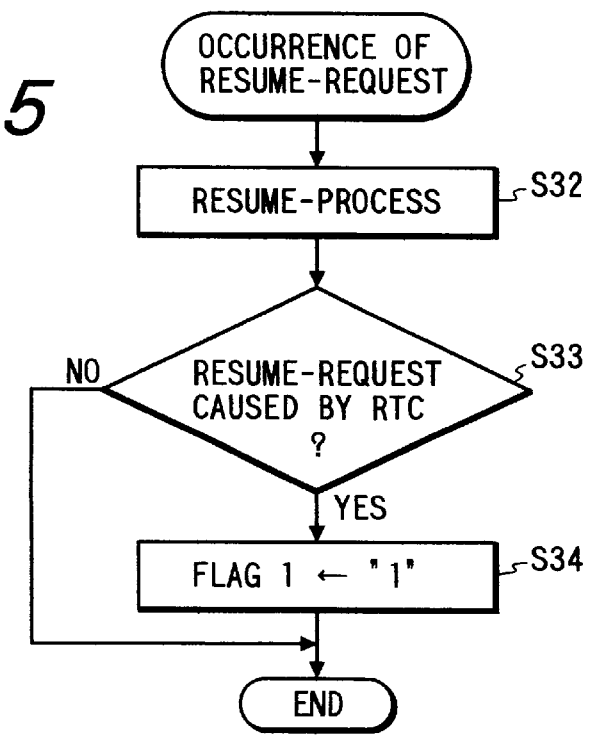
FIG. 5 is a flow chart showing a resume-process of the second embodiment of the present invention.

FIG. 5 is a flow chart showing a resume-process of a ROM 2.

This flow chart shows a process to be performed when a resume-request (RTC interrupt) occurs in the system suspend state (energy saving mode).

Upon occurrence of a resume-request, the resume-process shifts the mode from the system suspend state (energy saving mode) to the normal operation mode in step S32.

The CPU 1 determines in step S33 whether the resume-request has occurred by an RTC interrupt. If YES in step S33, the flow advances to step S34; otherwise, the operation is not the transmission process of this embodiment, and the process ends.

In step S34, flag 1 representing that the system has been resumed by the RTC interrupt is stored in a RAM 3 (flag 1="1"), and this process ends.

Figure 6:
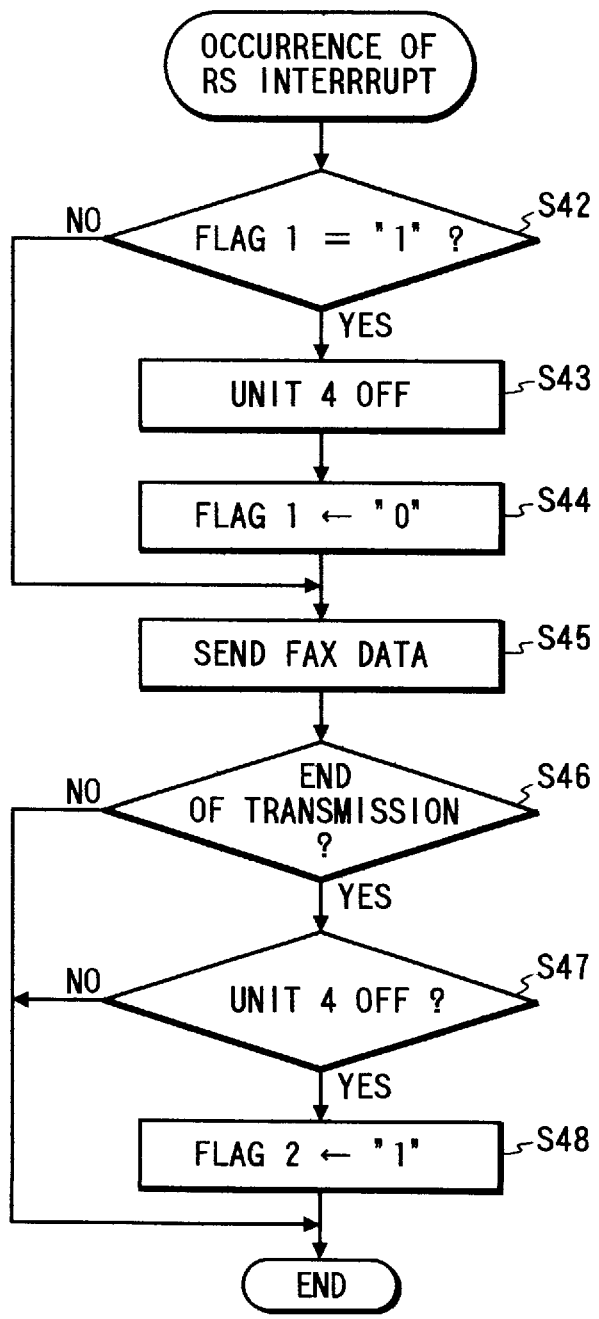
FIG. 6 is a flow chart showing a transmission operation of the second embodiment.

FIG. 6 is a flow chart showing a transmission operation at a time designated by the CPU 1 in accordance with the facsimile program.

This flow chart shows the transmission operation of the CPU 1 upon occurrence of an RS interrupt every time 1-byte facsimile data is sent.

Upon occurrence of an RS interrupt, flag 1 is read out from the RAM 3 in step S42 to determine the system has been resumed by the RTC interrupt. If YES (flag 1 ="1"), the flow advances to step S43; otherwise (flag 1 ="0"), the flow advances to step S45.

In step S43, the power supply of a device (display unit 4) which is not associated with the transmission operation is kept off. In step S44, the flag is cleared (flag 1="0"). The flow then advances to step S45.

In step S45, 1-byte data is sent as facsimile transmission data. The CPU 1 determines in step S46 whether the transmission operation has ended. If NO in step S46, this interrupt process ends, and the CPU 1 waits for the next interrupt.

When the transmission operation has ended, the flow advances to step S47 to determine whether the power supply of the device (display unit 4) which is not associated with the transmission is already turned off. If NO in step S47, this interrupt process ends, and therefore the transmission operation is terminated.

If YES in step S47, the flow advances to step S48 to set flag 2 (flag 2="1") for setting the system in the suspend mode and store the set flag 2 in the RAM 3. This interrupt process ends, and the transmission operation is terminated.

The suspend-process of the ROM 2 in this embodiment is the same in the flow chart of FIG. 4, and a detailed description thereof will be omitted.

In this manner, when the system is resumed upon detection of an RTC interrupt for performing facsimile transmission from the suspend state, information representing that the system has been resumed by the RTC interrupt is stored. Using this information, the power supply of a device unnecessary for transmission is kept off during the transmission. At the end of the transmission, the suspend state is restored.

In an operation except for the transmission and reception operations described in each of the above embodiments, a device unnecessary for a given process is kept off when the system is resumed for the given process, and resume- and suspend-processes can be performed as described above.

As has been described above, according to the present invention, to perform facsimile transmission/reception in the system suspend state, information representing that the system has been resumed for FAX transmission/reception is used to turn off the power supply of a device unnecessary for a corresponding operation, and transmission or reception is performed. At the end of this operation, a suspend state is restored, thereby more effectively attaining energy savings.

What is claimed is:

1. An information processing apparatus having a plurality of operation modes and a plurality of devices, comprising:

energy saving means for holding a system in an electrical energy saving mode;

discrimination means for discriminating a predetermined type of resume-request;

resume-process means for selecting one of said plurality of operation modes in accordance with the discriminated type of resume-request, and for shifting a system mode from the electrical energy saving mode to the selected operation mode; and execution means for executing the selected operation mode so as not to supply power to a first device unnecessary for the selected operation mode and to supply power to a second device necessary for the selected operation mode.

2. An apparatus according to claim 1, further comprising switching means for switching the system back to the electrical energy saving mode immediately upon completion of the execution of the selected operation mode.

3. An apparatus according to claim 1, wherein said device unnecessary for the selected operation mode is a display.

4. An apparatus according to claim 1, further comprising communication means, wherein the discriminated resume-request is a reception request, and said execution means does not supply power to a device unnecessary for reception in accordance therewith.

5. An apparatus according to claim 4, further comprising ring signal detection means, and the reception request is generated on the basis of a ring signal detection.

6. An apparatus according to claim 5, wherein said communication means is a facsimile communication means.

7. An apparatus according to claim 4, wherein said communication means is a facsimile communication means.

8. An apparatus according to claim 1, further comprising communication means, wherein the discriminated resume-request is a transmission request, and said execution means does not supply power to a device unnecessary for transmission in accordance therewith.

9. An apparatus according to claim 8, further comprising a real time clock, and the transmission request represents a transmission operation at a time designated by an interrupt of said real time clock.

10. An apparatus according to claim 9, wherein said communication means is a facsimile communication means.

11. An apparatus according to claim 8, wherein said communication means is a facsimile communication means.

12. An information processing method for a system having a plurality of operation modes and a plurality of devices, comprising the steps of:
holding the system in an electrical energy saving mode;
discriminating a predetermined type of resume-request;
selecting one of said plurality of operation modes in accordance with the discriminated type of resume-request;
shifting the system from the electrical energy saving mode to the selected operation mode; and
executing the selected operation mode so as not to supply power to a first device unnecessary for the operation mode and to supply power to a second device necessary for the selected operation mode.

13. A method according to claim 12, further comprising the step of switching the system back to the electrical energy saving mode immediately upon completion of the execution of the selected operation mode.

14. A method according to claim 12, wherein said device unnecessary for the selected operation mode is a display.

15. A method according to claim 12, wherein the system further comprises communication means, and wherein the discriminated resume-request is a reception request, and in said execution step power is not supplied to a device unnecessary for reception in accordance therewith.

16. A method according to claim 15, further comprising the step of detecting a ring signal, and the reception request is generated when the ring signal is detected.

17. A method according to claim 16, wherein the communication means is a facsimile communication means.

18. A method according to claim 15, wherein the communication means is a facsimile communication means.

19. A method according to claim 12, wherein the system further comprises communication means, and wherein the discriminated resume-request is a transmission request, and in said execution step power is not supplied to a device unnecessary for transmission in accordance therewith.

20. A method according to claim 19, wherein the system further comprises a real time clock, and the transmission request represents a transmission operation at a time designated by an interrupt of the real time clock.

21. A method according to claim 20, wherein the communication means is a facsimile communication means.

22. A method according to claim 19, wherein the communication means is a facsimile communication means.

23. An information processing apparatus having a plurality of operation modes including an automatic communication mode, comprising:
display means for displaying information to an operator;
operating means for inputting a designation for communication by the operator;
energy saving means for holding said apparatus in an electrical energy saving mode;
discriminating means for discriminating whether or not a predetermined request is for the automatic communication mode;
resume-process means for selecting the automatic communication mode if said discrimination means discriminates that the predetermined request is for the automatic communication mode, and for shifting said apparatus from the electrical energy saving mode to the selected automatic communication mode; and
execution means for executing the selected automatic communication mode so as not to supply power to said display means and to supply power to a device necessary for the selected automatic communication mode.

24. An apparatus according to claim 23, further comprising switching means for switching the apparatus to the electrical energy saving mode immediately upon completion of the execution of the selected automatic communication mode.

25. An apparatus according to claim 15, further comprising communication means, wherein the discriminated request is a reception request.

26. An apparatus according to claim 25, wherein said communication means is a facsimile communication means.

27. An apparatus according to claim 17, further comprising ring signal detection means, and the reception request is generated on the basis of a ring signal detection by said ring signal detection means.

28. An apparatus according to claim 27, wherein said communication means is a facsimile communication means.

29. An apparatus according to claim 23, further comprising communication means, wherein the discriminated request is a transmission request, and said execution means does not supply power to said display means in accordance therewith.

30. An apparatus according to claim 29, further comprising a real time clock, and the transmission request represents a transmission operation at a time designated by an interrupt of said real time clock.

31. An apparatus according to claim 30, wherein said communication means is a facsimile communication means.

32. An apparatus according to claim 29, wherein said communication means is a facsimile communication means.

33. A method for an information processing apparatus having a plurality of operation modes including an automatic communication mode and a display for displaying information to an operator, comprising the steps of:
inputting a designation for communication by the operator;

holding the apparatus in an electrical energy saving mode;

discriminating whether or not a predetermined request is for the automatic communication mode, selecting the automatic communication mode if in said discrimination step it is discriminated that the predetermined request is for the automatic communication mode;

shifting an apparatus mode from the electrical energy saving mode to the selected automatic communication mode; and executing the selected automatic communication mode so as not to supply power to the display and to supply power to a device necessary for the selected automatic communication mode.

34. A method according to claim 33, further comprising the step of switching the apparatus to the electrical energy saving mode immediately upon completion of the execution of the selected automatic communication mode.

35. A method according to claim 33, wherein the information processing apparatus further comprises communication means, and wherein the request is a reception request.

36. A method according to claim 35, wherein the communication means is a facsimile communication means.

37. A method according to claim 35, further comprising the step of detecting a ring signal, and the reception request is generated on the basis of the ring signal detection in said detection step.

38. A method according to claim 37, wherein the communication means is a facsimile communication means.

39. A method according to claim 33, wherein the information processing apparatus further comprises communication means, and wherein the request is a transmission request, and in said execution step power is not supplied to the display in accordance therewith.

40. A method according to claim 39, wherein the communication means is a facsimile communication means.

41. A method according to claim 39, wherein the information processing apparatus further comprises a real time clock, and the transmission request represents a transmission operation at a time designated by an interrupt of the real time clock.

42. A method according to claim 41, wherein the communication means is a facsimile communication means.

* * * * *

UNITED STATES PATENT AND TRADEMARK OFFICE
CERTIFICATE OF CORRECTION

PATENT NO. : 5,870,209
DATED : February 9, 1999
INVENTOR(S) : TADANOUBU FUJITA

It is certified that error appears in the above-identified patent and that said Letters Patent is hereby corrected as shown below:

COLUMN 6

Line 37, "claim 15," should read --claim 23,--;
Line 43, "claim 17," should read --claim 25,--.

Signed and Sealed this

Seventh Day of December, 1999

Attest:

Attesting Officer

Q. TODD DICKINSON

Acting Commissioner of Patents and Trademarks